Jan. 26, 1971 M. P. HODGES 3,558,228
MULTI-PURPOSE RANGING DEVICE INCLUDING
A MOVABLE INDEXING MEMBER
Filed Dec. 16, 1968 3 Sheets-Sheet 1

MARVIN P. HODGES
INVENTOR.

BY

ATTORNEY

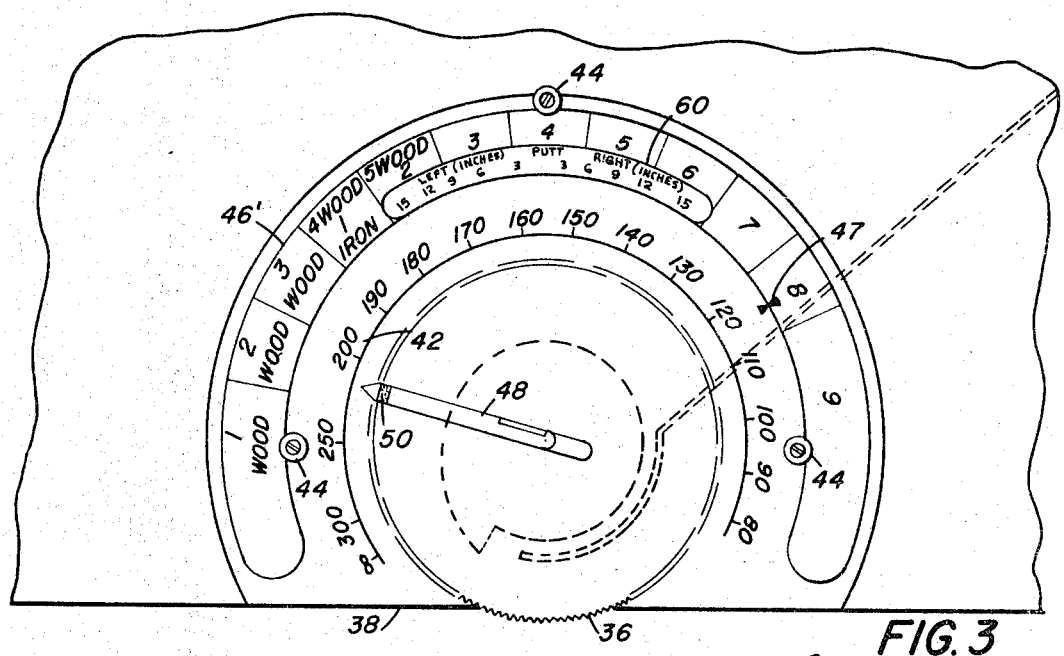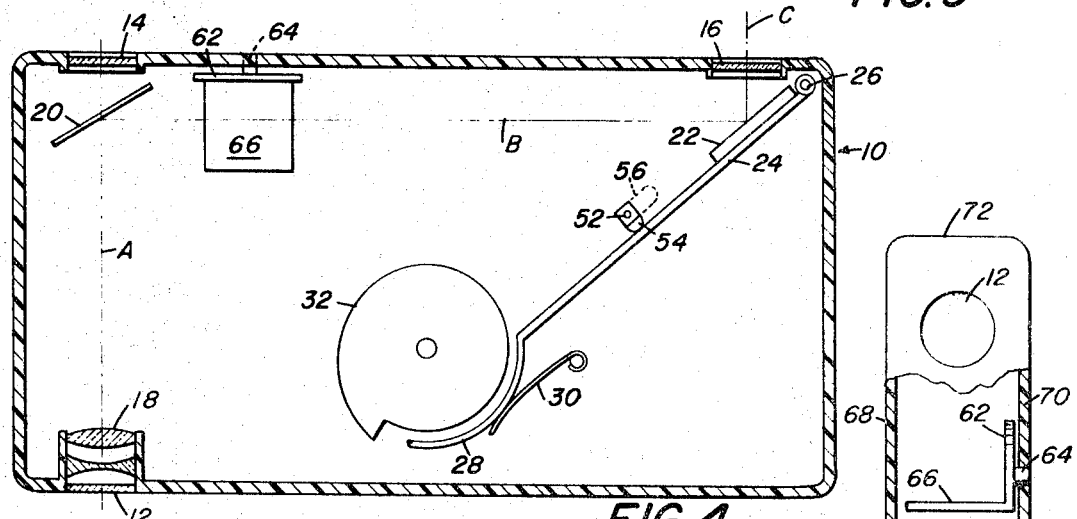

Jan. 26, 1971      M. P. HODGES      3,558,228
MULTI-PURPOSE RANGING DEVICE INCLUDING
A MOVABLE INDEXING MEMBER
Filed Dec. 16, 1968      3 Sheets-Sheet 3
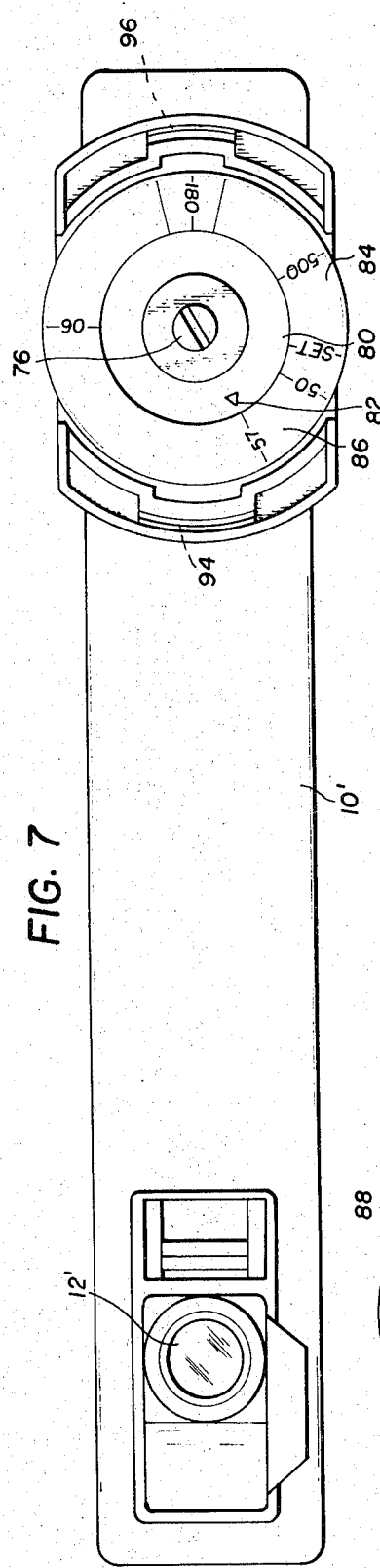
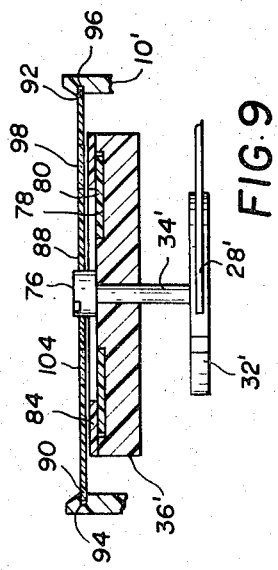
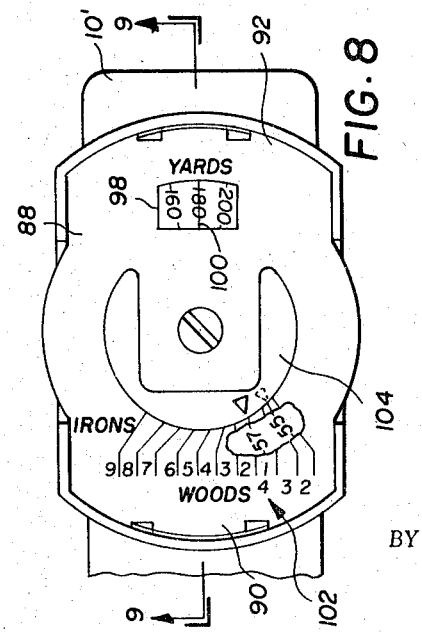
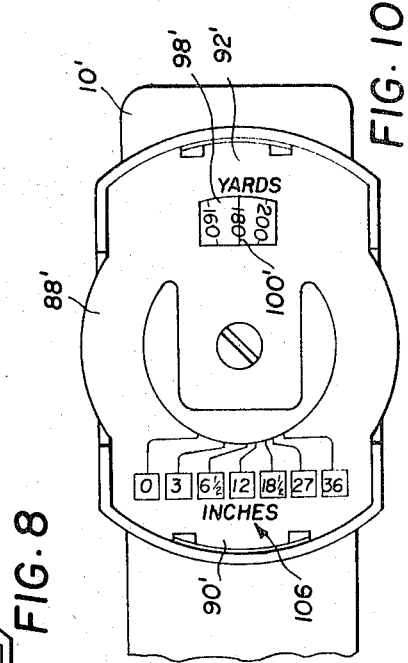
MARVIN P. HODGES
INVENTOR.
BY *Steve W. Grambow*
ATTORNEYS United States Patent Office 3,558,228
Patented Jan. 26, 1971

3,558,228
MULTI-PURPOSE RANGING DEVICE INCLUDING
A MOVABLE INDEXING MEMBER
Marvin P. Hodges, 82 Shirewood Drive,
Rochester, N.Y. 14625
Continuation-in-part of application Ser. No. 542,136,
Apr. 12, 1966. This application Dec. 16, 1968, Ser.
No. 795,383
Int. Cl. G01c 3/12
U.S. Cl. 356—17          13 Claims

ABSTRACT OF THE DISCLOSURE

A multi-purpose ranging device for selectively translating a distance determination or golf green inclination into useful information for uses such as hunting and golfing, and functioning as a magnifying monocular lens system. The ranging device has mechanism for personalizing the device so that it will accurately indicate the useful information for a particular individual, rifle, or the like.

BACKGROUND OF THE INVENTION

This application is a continuation-in-part of patent application Ser. No. 542,136, filed Apr. 12, 1966, now abandoned.

This invention relates generally to a multi-purpose ranging device, and more specifically to a multi-purpose ranging device for translating a distance determination, or golf green inclination into useful information for uses such as hunting, and golfing, and functioning as a magnifying monocular lens system.

Information determining devices such as range finding devices are on the market for use with photographic apparatus for determining short linear distances, but few of such devices are accurate beyond short ranges and none to applicant's knowledge translate distance into any other more useful information or can be converted into a magnifying monocular lens system. When such prior art range finding devices are used for hunting, golfing, or the like, it is necessary for the operator to first determine the distance to the object, and then to consult separate graphs, charts or the like in order to translate the distance reading into other more useful information. In the case of golfers, applicant is unaware of any information determining device to enable any particular golfer, regardless of variations in skill, to determine the range or the inclination of a golf cup or green respectively and to automatically translate this determination into useful information so that the golfer knows the correct golf club he should use or the number of inches, to the left or right of the golf cup, that he should aim his putt. Applicant's improved multi-purpose device automatically translates the range in one case, or golfing green inclination in another, into useful information, particularly for golfing and/or hunting. Applicant's device further is adjustable to permit personalizing the device to accurately indicate the useful information for all persons, rifles or the like, regardless of variations therein.

SUMMARY OF THE INVENTION

One object of the present invention is to provide an information determining device for automatically translating a distance determination, or a golf green inclination, into more useful information.

Another object of the invention is to provide an improved multi-purpose device capable in one mode of operation to translate distance into useful information, in another mode of operation to translate the inclination of a golfing green from the horizontal into useful information, and in still another mode of operation to function as a magnifying monocular lens system.

Another object of the invention is to provide a ranging device having means for personalizing the device to accurately indicate useful information for persons of varied skills, rifles of varied design and the like.

Another object of the invention is to provide a multi-purpose device for, among other things, translating range or distance, or the inclination of a golfing green into useful information, such device further being of simple design and construction, thoroughly reliable and efficient in operation, and economical to manufacture.

To secure these objects, the invention includes within its scope a multi-purpose device capable in one mode of operation to optically determine the range or distance of an object and to translate this distance into useful information, in a second mode of operation to determine the inclination of a surface to the horizontal and to translate this information into useful information, and in a third mode of operation to function as a magnifying monocular lens system. In the first mode of operation, optical means are used in conjunction with indicating means, which are responsive to the optical means, and cooperable with selective scales for indicating useful information such as the sight elevation setting of a gun or type of golf club that should be used. In this mode of operation, the device is provided with means for personalizing the device to accurately indicate useful information for persons of varied skills and rifles of varied designs. In the second mode of operation, the optical and indicating means are disconnected from one another, and the indicating means, in response to gravity and the inclination of a golfing green, cooperates with a scale to indicate the number of inches to the right or left of the golf cup that the golfer should aim his putt. In the third mode of operation, a portion of the optical means is disabled with the remainder of the optical means functioning as a magnifying monocular lens system.

Objects and advantages other than those set forth above will be apparent from the following description when read in connection with the accompanying drawings, in which:

BRIEF DESCRIPTION OF THE DRAWINGS

In the drawings:

FIG. 3 is a view similar to FIG. 2 in which a scale useful in golfing is substituted for the rifle elevation factor scale;

FIG. 4 is a slightly enlarged view in section of the device of FIG. 1 showing the cam and linkage interconnection between the optical and indicating means;

FIG. 5 is a side elevation view partially in section of the device of FIG. 4;

FIG. 6 is a segmental view partially in section of the structure of FIG. 5 turned through an angle of 90 degrees; and FIGS. 7–10 show the preferred embodiment of the invention.

DESCRIPTION OF THE PREFERRED EMBODIMENTS

With reference to the drawings, the multi-purpose device comprises a rectangular housing 10 for supporting an optical means and an indicating means, now to be described.

Figure 1:
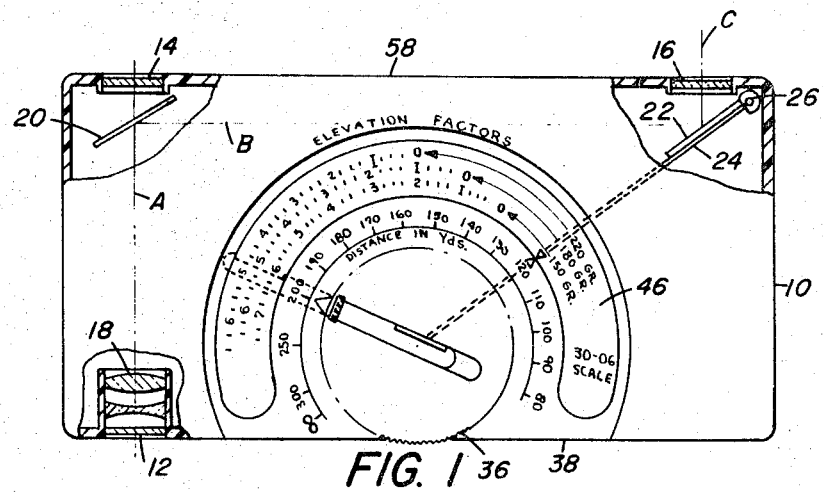
FIG. 1 is a top plan view of the dual function information determining device of this invention with portions thereof broken out and sectioned.

The optical means essentially utilizes the well known triangulation system for determining the range of an object, and comprises three glass disks 12, 14, and 16, of which disks 12 and 14, are aligned. A galinean magnifying lens system 18 is provided in the optic path A adjacent disk 12 through which the operator sights to observe an object. A beam splitter 20 of any known type is interposed in the optic path A of the monocular lens system to produce a second optic path B substantially at right angles to the optic path A. The optic path B intersects a pivotally mounted mirror 22 and is reflected to form a third optic path C. With this type of optical system, the observer's eye as seen in FIG. 1, will see one image of the object through disks 12, 14 and lenses 18 of the monocular system along optic path A, and another image of the object by virtue of the beam splitter 20 and pivotal mirror 22 along optic paths B and C. By pivotally moving mirror 22, the observer in sighting an object may move one of the images of the object relative to the other until the two images are superimposed upon one another, at which point the optic paths A and C intersect at the object.

Figure 2:
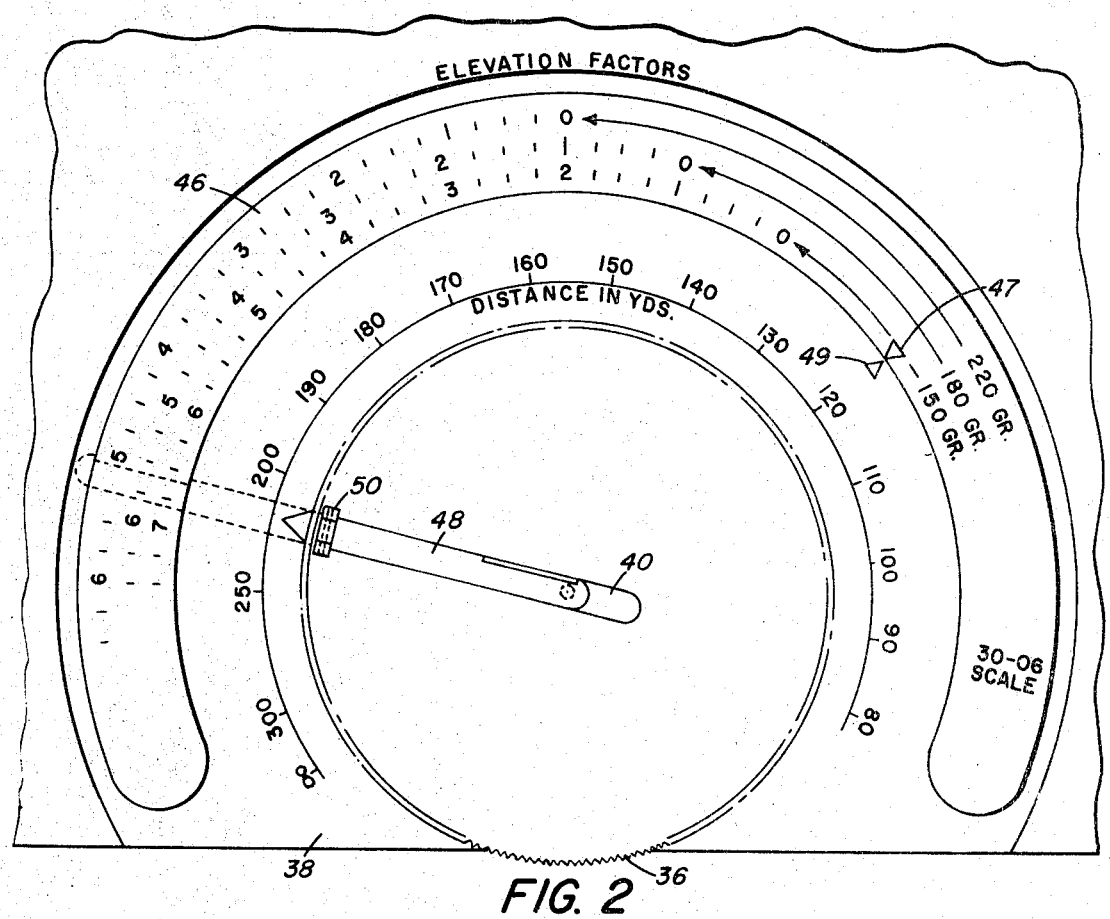
FIG. 2 is an enlarged, segmental view of a portion of the device of FIG. 1 showing in better detail the elevation factor scale for 30–06 caliber bullets having different grain values.

The pivotally movable mirror 22 is secured to an arm 24 pivoted at 26 as best seen in FIGS. 3 and 4. The opposite end of arm 24 forms a shoe 38 that is normally urged by a spring 30 into engagement with the periphery of a cam 32. The cam 32 is secured to a shaft 34 rotatably supported by the housing 10 as best seen in FIG. 5. The shaft 34 and the cam 32 are manually movable by a knurled disk 36 secured to one end of shaft 34, and extending beyond a side 38 of housing 10 as best seen in FIG. 2. Also secured to disk 36 an indicator arm 40 that is movable therewith. It is obvious that when knurled disk 36 is manually moved by the operator, the cam 32 will cooperate with shoe 28 for pivotally moving mirror 22 until the images are superimposed as aforementioned. When this occurs, the indicator arm 40 will indicate on a range scale 42 on housing 10 surrounding disk 36 the distance that the object is away from the operator.

Although in the embodiment of the invention disclosed, the mirror 22 is pivotally movable to secure registration of the images, it is possible to fixedly mount mirror 22 and pivot beam splitter 20 instead. In such a modification, the arm 24 would have to be mechanically connected to beam splitter 20.

Holding means, comprising a plurality of screws and washers 44 are provided on the top of housing 10 for releasably securing a scale 46 surrounding the distance scale 42. In FIGS. 1 and 2, scale 46 indicates various elevation factors for 30-06 caliber bullets having three different grain values. The scale has an index 47 alignable with a reference index 49 for properly positioning the scale to indicate the theoretically correct elevation factors relative to the distance. Each scale is adjustable from the indexed position to compensate for different makes and length of 30-06 rifles, each of which may require a slightly different elevation factor for the same distance. Consequently, it is possible for an owner of several 30-06 rifles to personalize or adjust the scale for each rifle. Once having done so, the owner can scratch a new reference index 49 adjacent the scale that will be correct for each rifle.

The indicator arm 40 has an extension 48 hinged thereto at 50, as best seen in FIGS. 2 and 5, and movable into the dotted position seen in FIGS. 1 and 2 for obtaining an elevation reading corresponding to the distance reading of the device. As seen in FIGS. 1 and 2, the distance of the object from the observer is approximately 220 feet, and the theoretical elevation factor used for a 30-06 caliber rifle using a 220 grain bullet would be approximately 5.2. Different scales 46 would be used for other grain values of bullets, and for different rifles.

This device is also useful to golfers, and in this connection a scale 46' of the type disclosed in FIG. 3 is used. The golfer can zero in on the pin inserted in the cup, not shown, with this device, and the indicator arm 40 will indicate correctly the type of club that the golfer should use. As seen in FIG. 3, at a distance of approximately 220 yards from the cup, the number 2 club would be indicated for use for an average golfer. This device would be extremely helpful to the amateur golfer who may have difficulty judging his distances, and the type of wood or iron club that should be used for any specific shot. Because golfing skills vary, the club selection scale can be personalized, as can any other scale, by adjusting the scale to the right or left of the reference index 49 as best seen in FIG. 2. The golfer can then mark a new reference index 49 on housing 10 that is correct for him.

Instead of having a semi-circular scale with indicia surrounding the rotatable knob carrying an indicator arm, it is possible to have circular scales with indicia adjustably mounted on the knob, and an indicator arm adjustably secured to the housing surrounding the knob. In other words, instead of having a fixed scale and a movable indicator arm with personalization accomplished by adjusting the scale as explained heretofore, it is possible to reverse the functions and have a movable scale and a fixed indicator arm with personalization accomplished by adjusting the indicator arm.

In a preferred embodiment of the invention shown in FIGS. 7–10, parts similar to parts designated in FIGS. 1–6 will be denoted by the same numerals primed. In this embodiment, as best seen in FIG. 9, knob 36' is adjustably secured frictionally to shaft 34' which is provided with a slotted head 76 to permit adjustable movement of shaft 34' and cam 32' relttive to knob 36'. The upper surface of knob 36' has an annular groove 78 for slidably receiving an annular reference disk 80 having a reference mark 82 thereon. An annular distance scale 84 is secured by any suitable means to the upper surface of knob 36' with the inner edge thereof overlying reference disk 80, and has distance indicia 86 placed thereon measured in yards. To initially adjust the ranging device, knob 36' is turned until a "set" position is in registry with scale indicator mark 100, and a target that is known to be at infinity is sighted through the ranging device. The shaft 34' is adjusted by screw head 76 while knob 36' is held fixed to adjust the relative position of cam 32' to knob 36' until the two images of the object are superimposed. The ranging device is then in an adjusted position for accurately indicating distances at least up to 500 yards.

A flexible golf scale 88 (see FIGS. 8 and 9) is releasably secured to housing 10' by different sized lugs 90, 92 at the ends thereof insertable into corresponding slots 94, 96 respectively in housing 10' to permit securement of golf scale 88 thereto in only one position. The scale has a transparent section 98 with an index mark 100 thereon overlying the distance scale 84 for indicating the distance in yards of superimposed images of an object viewed through the ranging device. At the opposite end of golf scale 88, indicia 102 is provided adjacent a transparent window 104 to indicate useful information in the form of golfing club information. To prepare the ranging device to provide distance translation into desired or useful golf club information, it is necessary to initially align the reference mark 82 on reference disk 80 to a predetermined numeral on the distance indicia 86 which is marked on the back of each distance scale 84 which, during operation of the ranging device, will indicate on the indicia 102 of scale 88 a correct golf club for a specified distance for an average or normal golfer. The golf scale 88 is mounted on the device, and during operation, reference disk 80 will move with knob 36' due to the friction therebetween and reference mark 82 visible through window 104 will indicate on the indicator 102 the correct golf club for a specified distance.

Scales having indicia for other possible functions or uses such as compuating the waterspeed of sailing and motor boats, checking and charting course buoys and markers, and relocating particular positions on a lake may be provided. For example, in FIG. 10 a rifle scale 88' is shown for indicating useful information such as the elevation settings for a 270 Winchester rifle using 100 grain bullets of the PSP type for use in sighting a rifle to compensate for bullet trajectory. To prepare the ranging device for operation, reference mark 82 is moved into alignment with a predetermined numeral on the distance indicia 86 on indicia scale 84. This numeral is pre-printed on the back of this specific scale. The elevation setting scale 88' for this rifle is mounted on the device, and during operation, the reference mark 82 will indicate on indicia 106 the correct inches of elevation for an average or normal rifle of this type to compensate for bullet trajectory for any specific distance.

Since all golfers and all rifles are not average or normal, it is desirable to adjust or personalize the ranging device so that reference mark 82 will accurately indicate the golf club or inches of elevation for a particular golfer or rifle regardless of variations. This is accomplished by moving reference disk 80 and mark 82 relative to the predetermined numeral on distance indicia 86. The disk 80 is moved a predetermined amount, depending upon experience, so that reference mark 82 will accurately indicate for any specified distance the type of golf club or the inches or elevation for the particular golfer or rifle, respectively. This new position on distance indicia scale 886 for reference mark 82 should be marked on the back of the scale 88 in an area designed to accept personalized settings. For example, as seen in FIGS. 7 and 8, when reference mark 82 is placed on a predetermined numeral 57 for an average or normal golfer, the reference mark 82 indicates that a No. 2 iron or a No. 5 wood should be used for a 180 yard distance as shown in window 104. However, if the golfer finds through experience that for a 180 yard distance, best results are achieved with a No. 2 wood, reference disk 80 would be manually moved relative to distance indicia 86 until the reference mark 82 is in alignment with a No. 2 wood on indicia 102. He would note that at this 180 yard distance setting, the mark 82 would align with the numeral 55 on distance indicia 86 as seen dotted in FIG. 8. Accordingly, he would mark the numeral 55 on his golf scale 88, and whenever the ranging device is used for golfing, he would automatically set the reference mark 82 in alignment with the numeral 55 prior to mounting the golf scale 88 on the ranging device.

With respect to golf, this device may also be used to calculate the roll of the green, and to indicate to the golfer whether he should aim his putt to the left or the right of the cup, and the number of inches the imaginary cup should be displaced from the real cup. The device is provided with means (see FIGS. 4 and 5) for disconnecting the optical means from the indicating means comprising a stub shaft 52 rotatably supported by a wall of housing 10 and having a projection 54 secured to one end, and a handle 56 secured to the other end. The handle 56 is manually movable between operative and inoperative positions for pivotally moving projection 54 respectively into and out of engagement with arm 24 for moving the arm respectively out of and into engagement with cam 32. Detent means, not shown, may be used for releasably holding the disconnecting means in its operative and inoperative positions. In the operative position of the disconnecting means, shown in FIG. 4, shoe 28 is held out of engagement with cam 32, and hence cam 32, disk 36 and indicator arm 40 are free to move. When the disconnecting means is moved through an angle of 90° into its inoperative position, the projection 54 is moved out of engagement with arm 24 causing spring 30 to move shoe 28 into engagement with cam 32. When the golfer desires to make a putt on an inclined green, he manually moves the disconnecting means into its operative position to disable the optical means from the indicating means, and then places the device on the green with the upper side wall 58 (see FIG. 1) placed into engagement with the surface of the green. In this position, the indicator arm 40 under the influence of gravity will cooperate with a portion 60 of scale 46' indicated "putt" (see FIG. 3). If indicator 40 is pointing to the designation "6" on the part of the scale designated "left," the golfer then knows that he must aim his putt six inches to the left of the real cup.

With reference to the embodiment of the invention shown in FIGS. 1–3, as indicated heretofore, scale 46 is adjustable relative to index 49 and indicator arm 40 to personalize the device for a particular golfer or rifle. Such personalization of the device can also be achieved by fixedly mounting scale 46 on housing 10 with index marks 47 and 49 in alignment, and adjustably moving arm 40 relative to knob 36. To accomplish this, arm 40 is adjustably mounted on knob 36, preferably by a friction connection between a stub shaft 41 (seen dotted in FIG. 2) on arm 40 and a cooperating recess, not shown, in knob 36.

This device may also be used by the operator as a magnifying monocular lens system, if he so desires. To accomplish this, means are provided for automatically disabling the optic path B. The disabling means (see FIGS. 4 and 5) comprises a disk 62 rotatably mounted on a stub shaft 64 supported by housing 10. A shutter plate 66 is eccentrically secured to a peripheral edge of disk 62 and extends laterally therefrom. The shutter plate 66 acts as an off-center weight and when the device is in a position in which sides 68, 70 shown in FIG. 5, lie in a substantially horizontal plane, and ends 72, 74 lie in vertical planes, shutter plate 66 would be out of the optic path B. However, when the device is turned through an angle of 90 degrees from the aforementioned position with sides 68, 70 lying in vertical planes and ends 72, 74 lying in horizontal planes shutter plate 66 will automatically be interposed in the optic path B due to gravity, thereby disabling it. Instead of automatic disabling means, it is possible to provide a manually operated one comprising a shutter plate having a handle, not shown, at one end manually movable between operative and inoperative positions for moving the shutter plate respectively into and out of the optic path B. Detent means, not shown, may be used for releasably holding the manually operated disabling means in its operative and inoperative positions.

The invention has been described in detail with particular reference to a preferred embodiment thereof, but it will be understood that variations and modifications can be effected within the spirit and scope of the invention.

I claim:

1. In a ranging device having a housing, first optical means carried by the housing and including an eye piece for sighting an object along a first optic path, second optical means offset from the first optical means and cooperating therewith for producing an image of at least a part of the object along a second optic path, and manually operated means movable relative to the housing and connected to one of the first and second optical means for adjusting the one optical means to an object registering position, in which the first and second optic paths intersect at the object so that a single object is seen through the eye piece, the improvement comprising:

mounting means on one of the housing or said manually operated means for mounting one of a plurality of scales having indicia for indicating useful information on various subjects;

index means on the other of the housing or said manually operated means movable relative to said one scale and having a predetermined normal position relative to said one scale, said index means cooperable with said indicia on said one scale in response to movement of said manually operated means for indicating useful information corresponding to said registering position; and personalizing means for effecting adjustable relative movement between said one scale and said index means to a new position removed from said normal position so that the ranging device will accurately indicate useful information for a particular situation.

2. The invention according to claim 1 wherein said one scale is adjustable on said mounting means relative to said index means to provide a new relative position removed from said normal relative position.

3. The invention according to claim 1 wherein said index means is adjustable relative to said one scale to provide a new relative position removed from said normal relative position.

4. The invention according to claim 1 wherein said one scale is fixed on the housing, said index means comprises an index arm adjustably mounted on said manually operated means, and said personalizing means comprises adjusting said index arm on said manually operated means to a new position relative to said normal relative position between said index means and said one scale.

5. The invention according to claim 1 wherein said mounting means is on said housing for mounting said one scale having indicia, and said index means comprises a member adjustably mounted on said manually operated means, said member further having an index mark cooperating with said indicia on said scale.

6. The invention according to claim 5 wherein said manually operated means comprises a knob having an annular groove, and said member is annular and frictionally seated in said groove.

7. The invention according to claim 1, and further including means for disabling said second optical means, said disabling means comprising a shutter movable into and out of said second optical path.

8. The invention according to claim 1, and further including means for automatically disabling said second optical means, said disabling means comprising a rotatable member, and a shutter plate eccentrically mounted on said rotatable member.

9. The invention according to claim 1, and further includnig means for disconnecting said manually operated means from said one of said first and second optical means.

10. The invention according to claim 1 wherein said index means comprises an indicator arm mounted on said manually operated means, said one of said first and second optical means comprises a lever, and said device further includes means for disconnecting said manually operated means from said one of said first and second optical means, said disconnecting means comprising a manually movable projection adjacent said lever, and movable between an inoperative position, in which said lever and manually operated means are connected, and an operative position, in which said projection engages and moves said lever out of engagement with said manually operated means, whereby said manually operated means and said arm is responsive to gravity for indicating useful information depending upon the inclination of said instrument with the horizontal.

11. In a ranging device having a housing and means movable relative to said housing to a distance determining position in which the distance between the device and an object may be determined, the combination comprising:

mounting means on one of said housing or said distance determining means for selectively mounting one of a plurality of scales having indicia for indicating for indicating useful informaton on various subjects;

index means on the other of said housing or said distance determining means movable relative to said one scale and having a predetermined normal position relative to said one scale, said index means cooperable with said indicia on said one scale in response to movement of said distance determining means for indicating useful information corresponding to said distance determining position; and personalizing means for effecting adjustable relative movement between said one scale and said index means to a new position removed from said normal position so that the ranging device will accurately indicate useful information for a particular situation.

12. The invention according to claim 11 wherein said one scale is secured to the housing, and said index means comprises an index member having an index mark, said index member being adjustably mounted on said distance determining means for adjusting said index mark from said normal position to a new position.

13. The invention according to claim 11 wherein said mounting means is on said housing for mounting said one scale having indicia, and said index means comprises a member adjustably mounted on said distance determining means, said member further having an index mark cooperating with said indicia on said scale.

References Cited

UNITED STATES PATENTS 2,208,222  12/1969  Mische _____ 356—17

RONALD L. WIBERT, Primary Examiner

O. B. CHEW II. Assistant Examiner